United States Patent
Tsai et al.

(10) Patent No.: US 10,288,956 B2
(45) Date of Patent: May 14, 2019

(54) DISPLAY APPARATUS

(71) Applicant: Innolux Corporation, Miao-Li County (TW)

(72) Inventors: Tsung-Han Tsai, Miao-Li County (TW); Hsia-Ching Chu, Miao-Li County (TW); Mei-Chun Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/385,107

(22) Filed: Dec. 20, 2016

(65) Prior Publication Data
US 2017/0184928 A1  Jun. 29, 2017

(30) Foreign Application Priority Data
Dec. 28, 2015  (TW) ............... 104144078 A

(51) Int. Cl.
*G02F 1/1343* (2006.01)
*G02F 1/1362* (2006.01)
*G02F 1/1368* (2006.01)

(52) U.S. Cl.
CPC ...... *G02F 1/134336* (2013.01); *G02F 1/1368* (2013.01); *G02F 1/136286* (2013.01); *G02F 1/13439* (2013.01); *G02F 1/134309* (2013.01); *G02F 2001/134345* (2013.01); *G02F 2201/121* (2013.01); *G02F 2201/123* (2013.01)

(58) Field of Classification Search
CPC ......... G02F 1/134336; G02F 1/136286; G02F 1/1368

See application file for complete search history.

(56) References Cited

U.S. PATENT DOCUMENTS

| | | | |
|---|---|---|---|
| 9,261,748 B2* | 2/2016 | Shin | G02F 1/136286 |
| 9,759,962 B2* | 9/2017 | Jung | G02F 1/134336 |
| 2010/0079690 A1* | 4/2010 | Lee | G02F 1/133707 |
| | | | 349/37 |

* cited by examiner

*Primary Examiner* — Hoan C Nguyen
(74) *Attorney, Agent, or Firm* — Rabin & Berdo, P.C.

(57) ABSTRACT

A display apparatus includes a liquid crystal layer between first and second base plates. The first and second scan lines along a first direction are disposed adjacently above the first base plate. A first region defined by the first and second data/scan lines includes the first and second sub-pixel regions. The first sub-pixel region includes a first TFT (connected to the first scan line and the first data line) and a first electrode electrically connected to the first TFT. A first common electrode disposed above the first base plate includes the first and second portions connected to each other. The first portion corresponds to the first sub-pixel region and is adjacent to the first data line, and the second portion corresponds to the second sub-pixel region and is adjacent to the first data line, wherein a width of the first portion in the first direction is greater than a width of the second portion in the first direction.

15 Claims, 10 Drawing Sheets

DISPLAY APPARATUS

This application claims the benefit of Taiwan application Serial No. 104144078, filed Dec. 28, 2015, the subject matter of which is incorporated herein by reference.

BACKGROUND

Field

The disclosure relates in general to a display apparatus, and more particularly to the design of width variation of the common electrode applied to a display apparatus.

Description of the Related Art

Electronic products with display panel have become indispensable necessities to modern people in their work, studies or entertainment. Examples of the electronic products include smartphones, PC tablets, notebooks, monitors and TVs. Of the said electronic products, the display apparatus with liquid crystal display (LCD) panel is most popular. The LCD panel, having the advantages of simplicity, lightweight, lower cost and higher reliability, provides a comfortable viewing experience for viewer's eyes, and has replaced the cathode ray tube (CRT) display and become the most popular display apparatus. The LCD panel also provides a wide range of selections including different sizes, shapes and resolutions.

Many details need to be handled carefully in the manufacturing process of the display apparatus. For example, the process for patterning the metal layer and the semiconductor layer (by way of lithography and etching) needs to be very accurate to avoid breakage, and the design of relative positions and pattern of each layer needs to be assured that the electrical properties of the manufactured display apparatus are stable and superior for satisfying various specifications of the products. If the display apparatus is in a poor design, the electrical performance of the display apparatus deteriorates. For example, severe problem of cross-talking will occur and the transmittance will decrease, thereby deteriorating the display quality of the display apparatus.

SUMMARY

The disclosure is directed to a display apparatus. Through the design of width variation of the common electrode in a region (such as a pixel region), the electrical performance of the display apparatus can be improved, superior transmittance can be maintained, and stable and superior display quality can be achieved.

According to one embodiment of the disclosure, a display apparatus is provided. The display apparatus includes: a first base plate, a second base plate and a liquid crystal layer disposed between the first base plate and the second base plate; a first scan line and a second scan line adjacent to the first scan line both disposed above the first base plate and extending along a first direction; a first data line and a second data line adjacent to the first data line both disposed above the first base plate; and a first common electrode disposed above the first base plate. The first scan line, the second scan line, the first data line and the second data line define a first region. The first region includes a first sub-pixel region and a second sub-pixel region. The first sub-pixel region includes a first thin-film transistor and a first electrode electrically connected to the first thin-film transistor. The first thin-film transistor is disposed above the first base plate and electrically connected to the first scan line and the first data line. The second sub-pixel region includes a second electrode. The first common electrode includes a first portion and a second portion connected to the first portion. The first portion corresponds to the first sub-pixel region and is adjacent to the first data line. The second portion corresponds to the second sub-pixel region and is adjacent to the first data line. The width of the first portion in the first direction is greater than the width of the second portion in the first direction.

The above and other aspects of the disclosure will become better understood with regard to the following detailed description of the preferred but non-limiting embodiment (s). The following description is made with reference to the accompanying drawings.

DETAILED DESCRIPTION

Figure 1A:
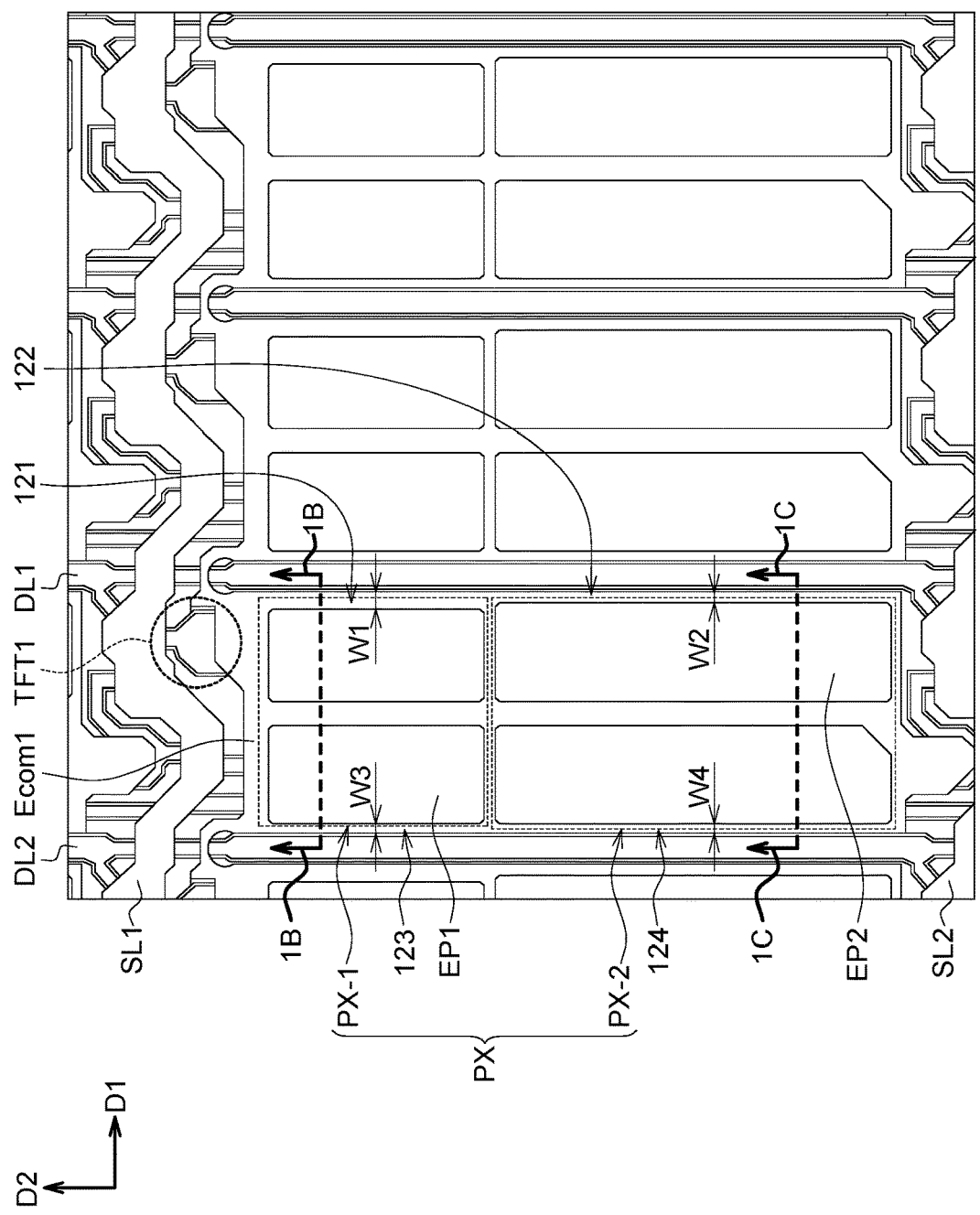
FIG. 1A is a bottom view of three adjacent pixel regions of a display apparatus according to an embodiment of the present disclosure.

A display apparatus is provided in the embodiment of the present disclosure. Through the design of common electrode having width variation in a region (such as a pixel region), the electrical performance of the manufactured display apparatus can be improved, for example, the capacitive coupling effect is significantly reduced. Therefore, during the operation of the display apparatus, the display quality of the pixels will not be significantly affected and interfered by the video signal transmitted from the data lines. Moreover, besides improvement of the electrical performance, the display apparatus disclosed in the embodiment could maintain superior transmittance. Therefore, superior and stable display quality of the display apparatus can be achieved by applying the design of the embodiment of the present disclosure with.

The embodiment of the present disclosure can be applied to an array substrate of a display apparatus, for example, in an array substrate such as a thin-film transistor (TFT) substrate of a liquid crystal display (LCD) device in a vertical alignment (VA) display mode. The embodiment of the present disclosure is exemplified by the structure of the pixels of an LCD panel in a low color shift mode. That is, single pixel region contains a bright region and a dark region, and when the display panel is viewed from the side, the bright region and the dark region will compensate each other such that the color shift can be reduced.

A number of embodiments of the present disclosure are disclosed below with reference to accompanying drawings. It should be noted that the structure configuration and description of the present disclosure are for exemplary purpose only, not for limiting the scope of protection of the present disclosure. Although the present disclosure does not illustrate all possible embodiments, a person ordinary skilled in the technology field can make necessary modifications or adjustments to fit actual needs without breaching the spirit and scope of the present disclosure. Therefore, the present disclosure can also be used in other embodiments not disclosed in the present disclosure. Moreover, the accompanying drawings are already simplified to more clearly illustrate the embodiments of the present disclosure, and the dimension scales used in the accompanying drawings are not based on actual proportion of the product. Therefore, the specification and drawings are for explaining and describing the embodiment only, not for limiting the scope of protection of the present disclosure. For elements the same as or similar to above embodiments, the same or similar reference numerals are used to indicate the same or similar elements.

Moreover, ordinal numbers, such as "the first", "the second", and "the third", are used in the specification and claims to modify the components of the claims. The ordinal numbers of claim components do not imply or represent that the said components have any previous ordinal numbers, nor represent the sequence between a particular claim component and another claim component or the sequence of process in a manufacturing method. The ordinal numbers used to clearly distinguish the claim components having the same designations.

Figure 1B:
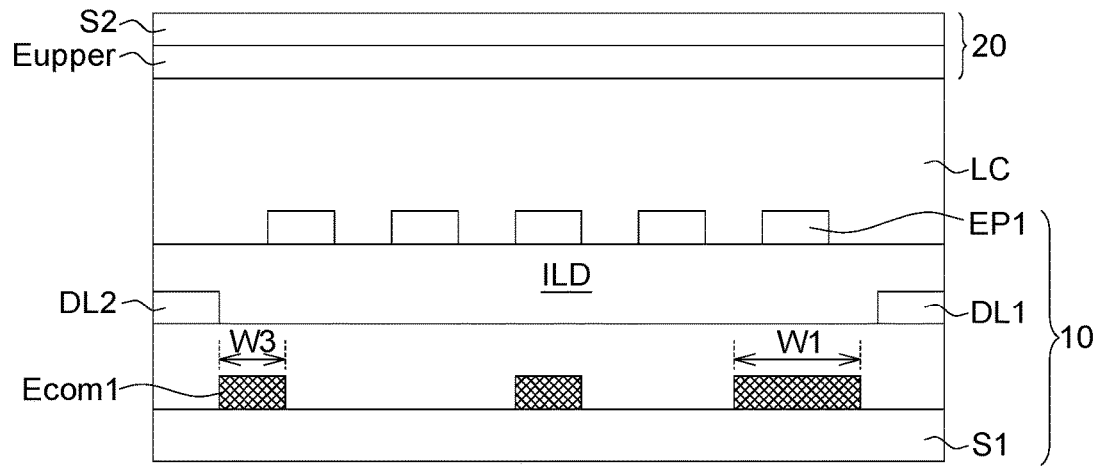
FIG. 1B is a cross-sectional view of a pixel region of the display apparatus of FIG. 1A along a cross-sectional line 1B-1B.

FIG. 1A is a bottom view of three adjacent pixel regions of a display apparatus according to an embodiment of the present disclosure. FIG. 1B is a cross-sectional view of a pixel region of the display apparatus of FIG. 1A along a cross-sectional line 1B-1B. FIG. 10 is a cross-sectional view of a pixel region of the display apparatus of FIG. 1A along a cross-sectional line 1C-1C. In an embodiment, the display apparatus includes a first substrate 10, a second substrate 20 and a display medium layer, such as a liquid crystal layer LC, disposed between the first substrate 10 and the second substrate 20 (FIG. 1B). The first substrate 10 and the second substrate 20 can be realized by an array substrate (such as a thin-film transistor (TFT) substrate) and a color filter substrate (CF substrate), respectively. In an embodiment, the first substrate 10 includes a first base plate S1, a plurality of intersected scan lines SL and data lines DL disposed above the first base plate S1. Two adjacent data lines (such as the first data line DL1 and the second data line DL2) and two adjacent scan lines (such as the first scan line SL1 and the second scan line SL2) are intersected with each other to define a region, such as a pixel region. The pixel region includes a pixel electrode layer and a common electrode. The pixel electrode layer is electrically connected to one of the first data line DL1 and the second data line DL2. In the present embodiment, the pixel electrode layer of the pixel region (labeled as PX) includes a first electrode EP1 and a second electrode EP2, and the pixel electrode layer is electrically connected to the first data line DL1.

As indicated in FIG. 1A, the first scan line SL1 and the second scan line SL2 adjacent thereto extend along a first direction D1. The first data line DL1 and the second data line DL2 adjacent thereto intersected with the first scan line SL1 and the second scan line SL2 to define a first region (such as a pixel region) PX. The first region PX includes a first sub-pixel region PX-1 and a second sub-pixel region PX-2. The first sub-pixel region PX-1 includes a first thin-film transistor TFT1 and the first electrode EP1. The first thin-film transistor TFT1 is disposed above the first base plate S1 and is further electrically connected to the first scan line SL1 and the first data line DL1. The first electrode EP1 is electrically connected to the first thin-film transistor TFT1. The second sub-pixel region PX-2 includes the second electrode EP2. A first common electrode $E_{com1}$ is disposed above the first base plate S1, and includes a first portion 121 and a second portion 122 connected to the first portion 121. The first portion 121 corresponds to the first sub-pixel region PX-1 and is adjacent to the first data line DL1. The second portion 122 corresponds to the second sub-pixel region PX-2 and is adjacent to the first data line DL1. According to the design of the embodiment, the width W1 of the first portion 121 in the first direction D1 is greater than the width W2 of the second portion 122 in the first direction D1. In another embodiment, the second electrode EP2 is electrically coupled to the second scan line SL2.

In an embodiment, the width W2 of the second portion 122 in the first direction D1 is between 1 μm to 3 μm. In another embodiment, a ratio of the width W1 of the first portion 121 in the first direction D1 to the width W2 of the second portion 122 in the first direction D1 is, for example, smaller than or equal to 6, and the width W1 of the first portion 121 in the first direction D1 is not greater than 10 μm.

Additionally, the first data line DL1 and the second data line DL2 extend along a second direction D2. In an embodiment, the length of the first portion 121 in the second direction D2 is greater than or equal to the length of the first electrode EP1 in the second direction D2. The length of the second portion 122 in the second direction D2 is greater than or equal to the length of the second electrode EP2 in the second direction D2. In an embodiment, the minimum width W1 of the first portion 121 in the first direction D1 is greater than the minimum width W2 of the second portion 122 in the first direction D1. In another embodiment, the widths of the first portion 121 along the first direction D1 are substantially the same (i.e. the first portion 121 has an uniform width W1), and the widths of the second portion 122 along the first direction D1 are substantially the same (i.e. the second portion 122 has an uniform width W2).

FIG. 1B and FIG. 10 only illustrate relative positions between the first data line D1, the second data line D2, the pixel electrode layer, and the common electrode in the first sub-pixel region PX-1 of a pixel region, so that the descriptions of the embodiment can be more clearer. Moreover, a dielectric interlayer ILD is interposed between the first common electrode $E_{com1}$ and the pixel electrode layer (such as the first electrode EP1 and the second electrode EP2) and disposed above the first base plate S1. In an embodiment, the first electrode EP1 and the second electrode EP2 can be realized by a transparent conductive film formed of ITO (indium tin oxide), IZO, ITZO or IGZO, there is not limited to, and can be used as a pixel electrode in the first sub-pixel region PX-1 and a pixel electrode in the second sub-pixel region PX-2, respectively. Furthermore, the first electrode EP1 and the second electrode EP2 are isolated from each other in the ITO structural configuration, and can be electrically connected to different thin-film transistors through other components, such that the first sub-pixel region PX-1 and the second sub-pixel region PX-2 are able to obtain their required gray-scale voltages, respectively. The first common electrode $E_{com1}$ can be manufactured at the same time with the scan lines or the thin-film transistor. In practical application, the first common electrodes $E_{com1}$ in the pixel regions (that is, adjacent first regions PX) arranged in the same row direction are interconnected.

Figure 1C:
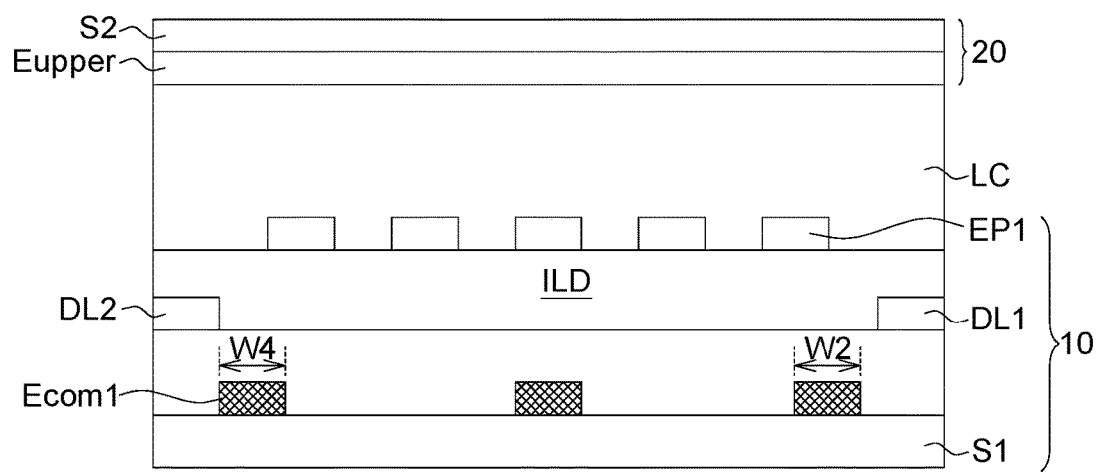
FIG. 1C is a cross-sectional view of a pixel region of the display apparatus of FIG. 1A along a cross-sectional line 1C-1C.

As shown in FIG. 1B and FIG. 1C, the second substrate 20 includes a second base plate S2 and an upper electrode $E_{upper}$ disposed above the second base plate S2. Other elements, such as the photoresist and light-shielding pattern (such as black matrix), not illustrated in the second substrate 20 are not repeated here. In an embodiment, the upper electrode $E_{upper}$ is an electrode having entire un-patterned surface such as an un-patterned transparent conductive film of ITO, it also could be considered as planar electrode. The pixel electrode layer (such as the first electrode EP1 and the second electrode EP2) disposed above the first base plate S1 is a patterned ITO electrode, such as an ITO electrode with several extending slits (not illustrated in FIG. 1A) making the pixel electrodes form a radiation pattern in a single pixel region. The electrical field generated between the upper electrode $E_{upper}$ and the pixel electrode layer can be used for driving the liquid crystal molecules of the liquid crystal layer LC to rotate.

As shown in FIG. 1A, the first common electrode $E_{com1}$ further includes a third portion 123 and a fourth portion 124 connected to the third portion 123. The third portion 123 corresponds to the first sub-pixel region PX-1 and is adjacent to the second data line DL2. The fourth portion 124 corresponds to the second sub-pixel region PX-2 and is adjacent to the second data line DL2. In an embodiment, the width of the third portion 123 in the first direction D1 is substantially equal to the width of the fourth portion 124 in the first direction D1. In this embodiment, the third portion 123 and the first portion 121 are at different sides of the first electrode EP1; the fourth portion 124 and the second portion 122 are at different sides of the second electrode EP2. According to an embodiment, the width W1 of the first portion 121 in the first direction D1 is greater than the width W3 of the third portion 123 in the first direction D1.

In an embodiment, the width W3 can be close to but not equal to the width W4, and the width W3 can be slightly less than or slightly greater than the width W4. Thus, the absolute value of the difference between the width W3 of the third portion 123 in the first direction D1 and the width W4 of the fourth portion 124 in the first direction D1 can be smaller than the difference between the width W1 of the first portion 121 in the first direction D1 and the width W2 of the second portion 122 in the first direction. This relation can be expressed as below:

$$|(W3-W4)|<(W1-W2).$$

Figure 2A:
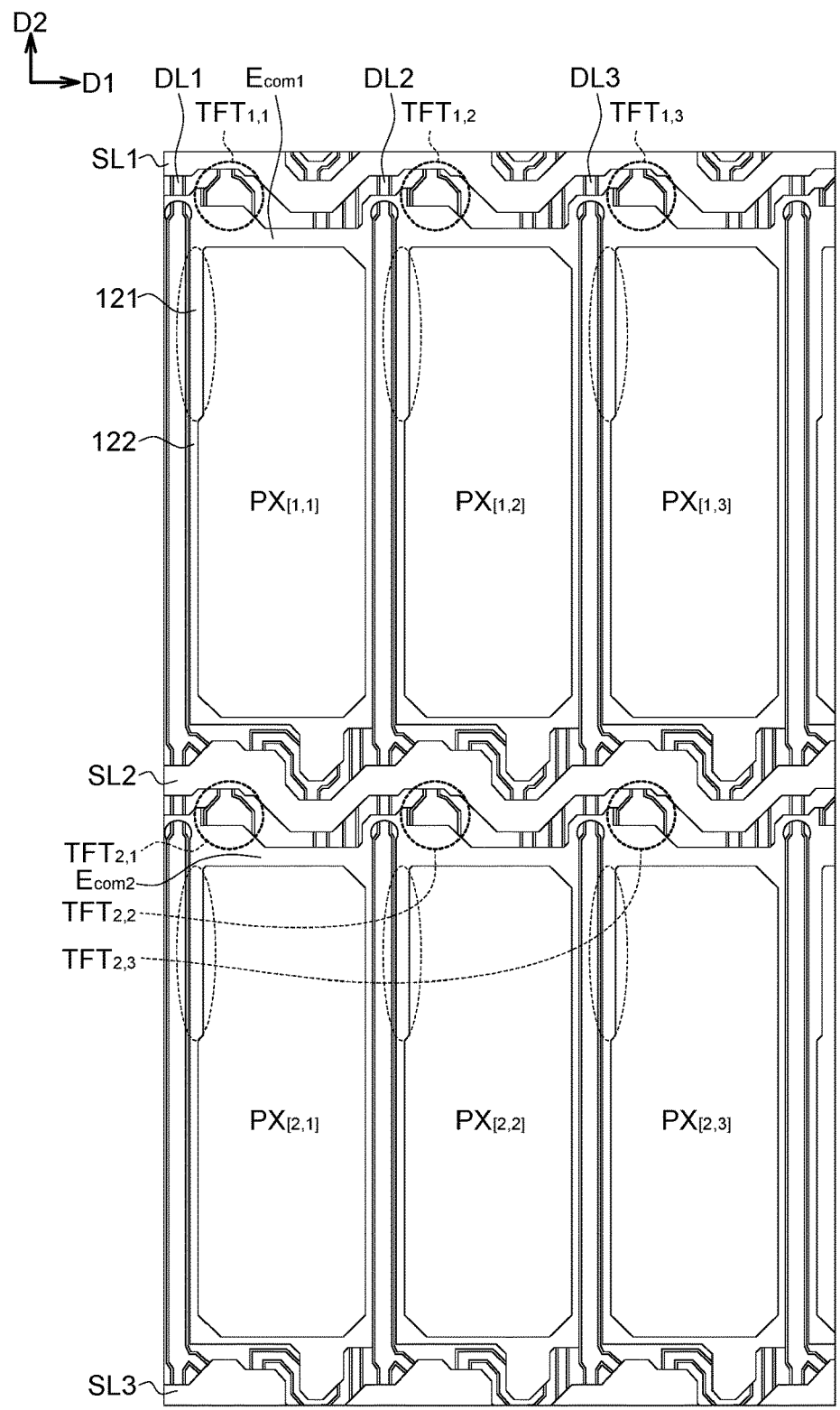
FIG. 2A and FIG. 2B are bottom views of two display apparatus according to a design of the embodiment of the present disclosure, wherein the thin-film transistors in the pixel regions arranged in the same column direction are disposed on the same side.
Figure 2B:
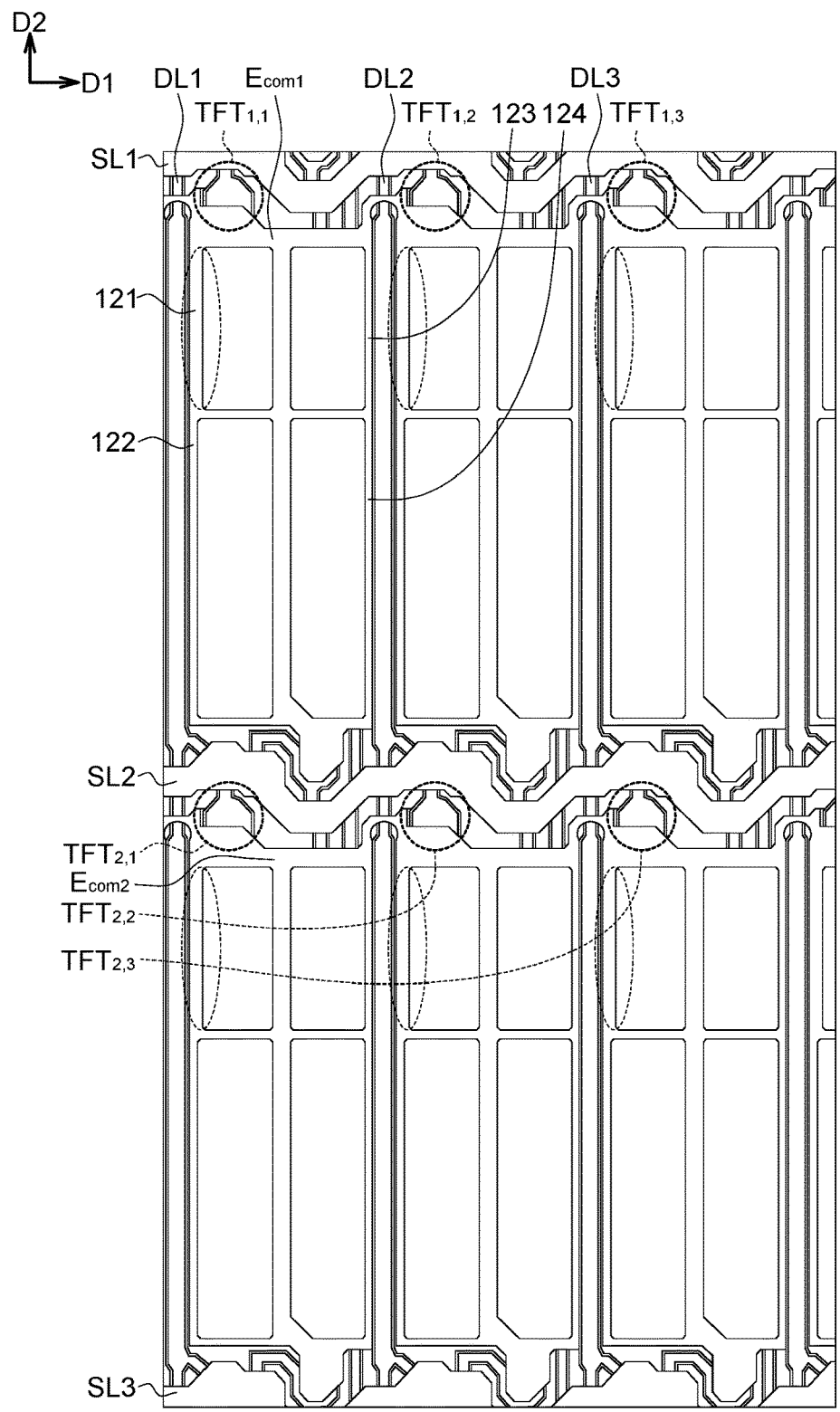

In practical application, the present disclosure can be applied to different structural configurations of the display apparatuses through suitable arrangement of the thin-film transistors in the pixel regions arranged in adjacent rows and/or adjacent columns. Referring to FIG. 2A and FIG. 2B, bottom views of two configurations of the display apparatus according to an embodiment of the present disclosure are shown. The thin-film transistors in several pixel regions arranged in the same column direction are disposed on the same side. That is, the structure of the pixel region of FIG. 1A is repeatedly shown in each row of the pixel array. Refer to FIG. 1A and related descriptions thereof. Details of the same elements are disclosed above, and are not repeated here. FIG. 2A and FIG. 2B both illustrate an m×n pixel array (composed of m rows and n columns), wherein m=2, n=3. The pixel array includes the pixel regions $PX_{[1,1]}$, $PX_{[1,2]}$, $PX_{[1,3]}$, $PX_{[2,1]}$, $PX_{[2,2]}$, $PX_{[2,3]}$. The thin-film transistors $TFT_{1,1}$ and $TFT_{2,1}$ of the pixel regions $PX_{[1,1]}$ and $PX_{[2,1]}$ are electrically connected to the first data line DL1. The thin-film transistors $TFT_{1,2}$ and $TFT_{2,2}$ of the pixel regions $PX_{[1,2]}$ and $PX_{[2,2]}$ are electrically connected to the second data line DL2. The thin-film transistors $TFT_{1,3}$ and $TFT_{2,3}$ of the pixel regions $PX_{[1,3]}$ and $PX_{[2,3]}$ are electrically connected to the third data line DL3. Refer to the circled areas of FIG. 2A and FIG. 2B. For the first common electrode $E_{com1}$ in each pixel region, the width of the first portion 121 in the first direction D1 is greater than the width of the second portion 122 in the first direction D1. The first portion 121 and the second portion 122 of the first common electrode $E_{com1}$ refer to two connected portions, that is, an upper portion and a lower portion, of the first common electrode $E_{com1}$, which correspond to the pixel region $PX_{[1,1]}$ and are adjacent to the first data line DL1. An upper portion as referred is the first portion 121, and a lower portion as referred is the second portion 122.

Figure 3:
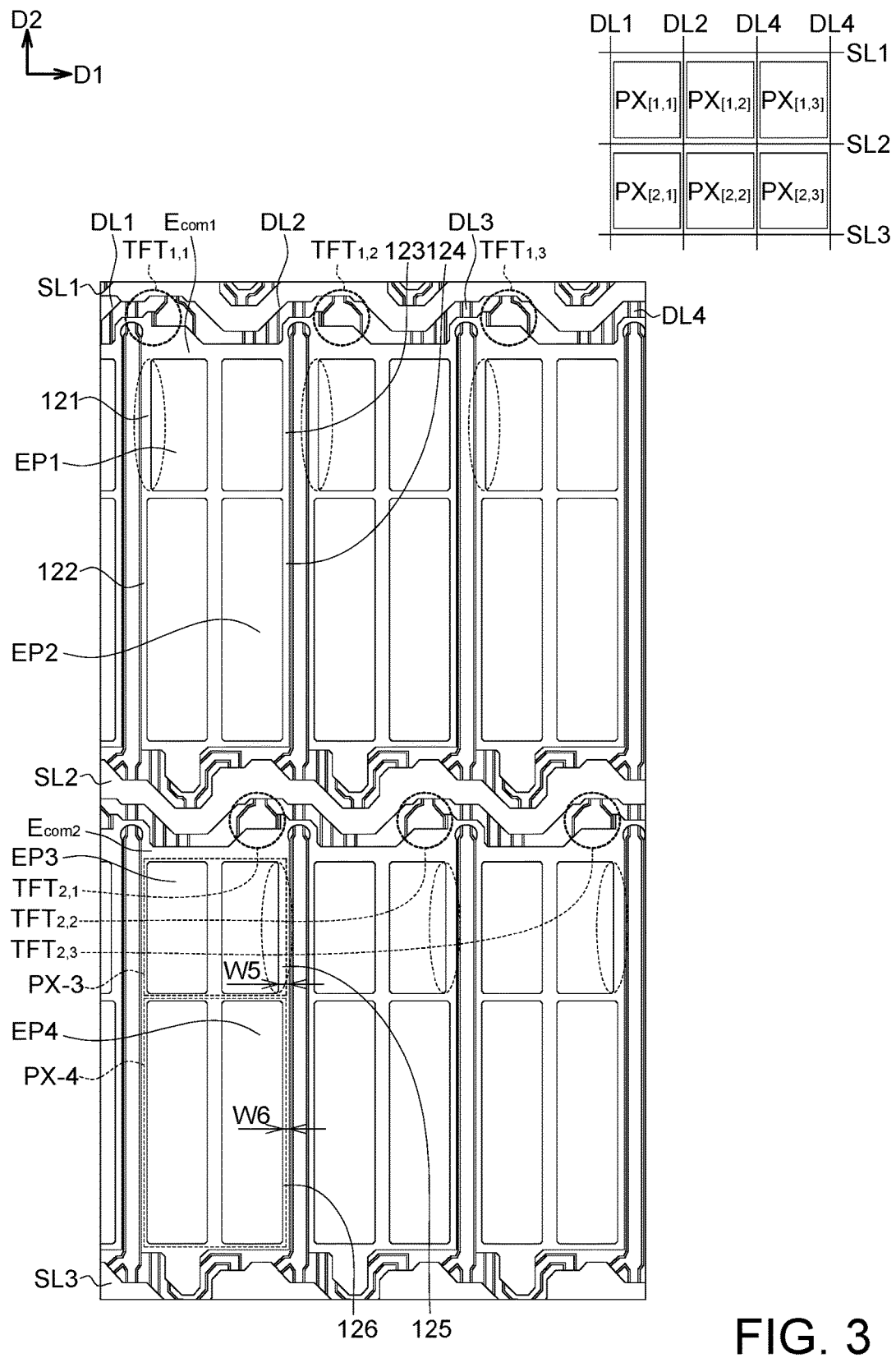
FIG. 3 is a bottom view of a display apparatus according to an embodiment of the present disclosure, wherein the thin-film transistors in the pixel regions arranged in the same column adjacent rows are disposed on different sides.

However, the present disclosure is not limited to the configurations of FIG. 2A and FIG. 2B and can be used in other embodiments as well. FIG. 3 is a bottom view of a display apparatus according to an embodiment of the present disclosure, wherein the thin-film transistors in several pixel regions arranged in the same row are disposed on the same side, but the thin-film transistors in several pixel regions arranged in adjacent rows of the same column are disposed on different sides. As shown in FIG. 3, the thin-film transistors $TFT_{1,1}$ and $TFT_{2,1}$ in the pixel regions $PX_{[1,1]}$ and $PX_{[2,1]}$ are electrically connected to the first data line DL1 and the second data line DL2, respectively. The thin-film transistors $TFT_{1,2}$ and $TFT_{2,2}$ in the pixel regions $PX_{[1,2]}$ and $PX_{[2,2]}$ are electrically connected to the second data line DL2 and the third data line DL3, respectively. The thin-film transistors $TFT_{1,3}$ and $TFT_{2,3}$ in the pixel regions $PX_{[1,3]}$ and $PX_{[2,3]}$ are electrically connected to the third data line DL3 and the fourth data line DL4, respectively. In terms of the pixel regions arranged in the same row, the first portions of the first common electrodes $E_{com1}$ are all disposed on the same side (that is, the left-hand side of the pixel electrode in each pixel region). In terms of the pixel regions arranged in the next row, the first portions of the first common electrodes $E_{com1}$ are disposed on the other side (that is, the right-hand side of the pixel electrode in each pixel region).

Descriptions of the design of an embodiment of the present disclosure are exemplified by two pixel regions $PX_{[1,1]}$ and $PX_{[2,1]}$ in FIG. 3. Structural details of the pixel region $PX_{[1,1]}$ (that is, the first region) defined by the first scan line SL1, the second scan line SL2, the first data line DL1 and the second data line DL2 are already described above (please refer to FIG. 1A and related disclosure), and are not redundantly repeated here. The display apparatus further includes a second common electrode $E_{com2}$ disposed above the first base plate S1 and positioned between the second scan line SL2 and a third scan line SL3 adjacent to the second scan line SL2. The second scan line SL2, the third scan line SL3, the first data line DL1 and the second data line DL2 define a second region (that is, the pixel region $PX_{[2,1]}$; the second region is adjacent to the first region). Similarly, the second region includes a third sub-pixel region PX-3 and a fourth sub-pixel region PX-4. The second region includes a thin-film transistor $TFT_{2,1}$ (the second thin-film transistor) electrically connected to the second scan line SL2 and the second data line DL2. The second pixel region further includes a pixel electrode layer, in the present embodiment, the pixel electrode layer includes a third electrode EP3 and a fourth electrode EP4, the third electrode EP3 is adjacent to the second scan line SL2, and the fourth electrode EP4 is adjacent to the third scan line SL3, and the third electrode EP3 is electrically connected to the second scan line SL2 through the thin film transistor $TFT_{2,1}$. The second common electrode $E_{com2}$ includes a fifth portion 125 and a sixth portion 126 both near the second data line DL2. The fifth portion 125 corresponds to the third sub-pixel region PX-3 and is adjacent to the second data line DL2. The sixth portion 126 corresponds to the fourth sub-pixel region PX-4 and is adjacent to the second data line DL2. The width W5 of the fifth portion 125 in the first direction D1 is greater than the width W6 of the sixth portion 126 in the first direction D1.

Moreover, in one embodiment, the width W6 of the sixth portion 126 in the first direction D1 is substantially equal to the width W4 of the fourth portion 124 in the first direction D1. In an embodiment, the width W5 of the fifth portion 125 in the first direction D1 is substantially equal to the width W1 of the first portion 121 in the first direction D1.

The liquid crystal material will lose its liquid crystal optical properties (such as the characteristics between voltage and transmittance) if the liquid crystal material receives a DC voltage over a long period of time. To avoid the liquid crystal material losing its liquid crystal optical properties, an AC voltage, instead of a DC voltage, is applied to the liquid crystal material to drive the liquid crystal molecules. Based on the polarity of the voltage applied to the pixel region, the most commonly seen polarity inversion can also be divided into frame inversion, row inversion, column inversion and dot inversion. The structures of FIG. 2A and FIG. 2B drive the liquid crystal molecules by way of column inversion. Unlike frame inversion (all adjacent pixels of the entire frame have the same polarity), column inversion makes the liquid crystal molecules of adjacent columns possess opposite polarities (for example, the pixels in the odd-numbered columns possess positive polarity, and the pixels in the even-numbered columns possess negative polarity), and therefore can resolve the problem of frame flickering. The structure of FIG. 3 drives liquid crystal molecules by way of column inversion but generates a display effect similar to that generated by way of dot inversion. In comparison to frame inversion, column inversion generates a display effect similar to that generated by way of dot inversion and makes adjacent pixels possess opposite polarities (for example, the polarity of a pixel is opposite to that of its four surrounding pixels, that is, the four pixels at the top, the bottom, the left and the right of the pixel), not only saving power consumption but also resolving the problem of frame flickering. However, the structures of FIG. 2A, FIG. 2B and FIG. 3 are for exemplary and explanatory purpose only. The present disclosure can be used in many different configurations, and can further be modified or adjusted according to actual needs in application.

Figure 4:
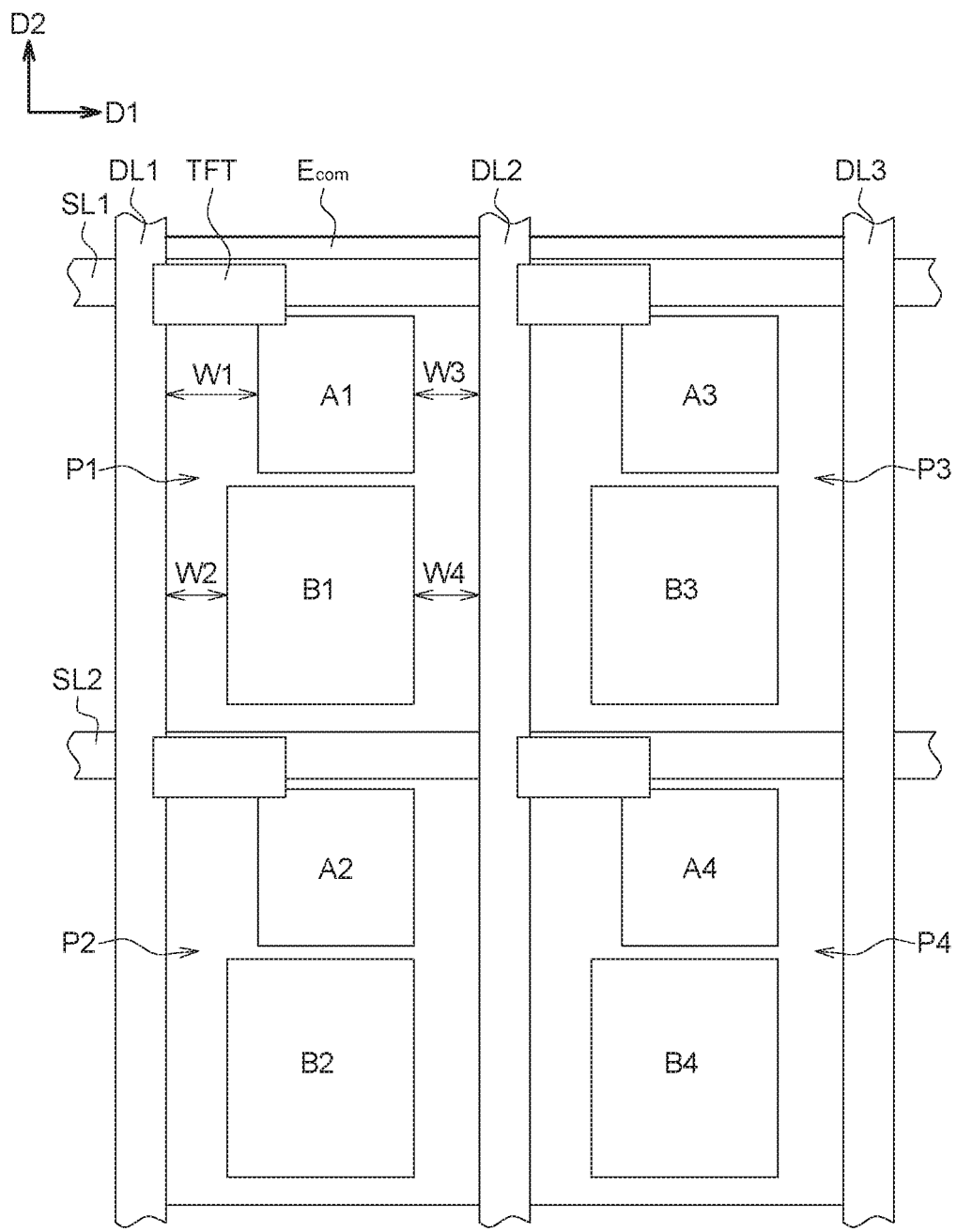
FIG. 4 is a schematic diagram of four adjacent pixel regions of the display apparatus exemplified as one example of the present disclosure.
Figure 5A:
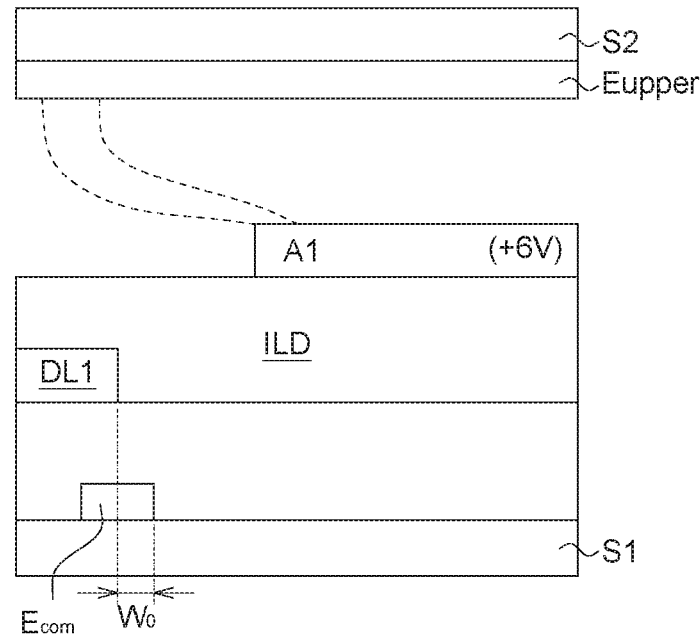
FIG. 5A is a cross-sectional view of a portion of a pixel region of a conventional display apparatus.
Figure 5B:
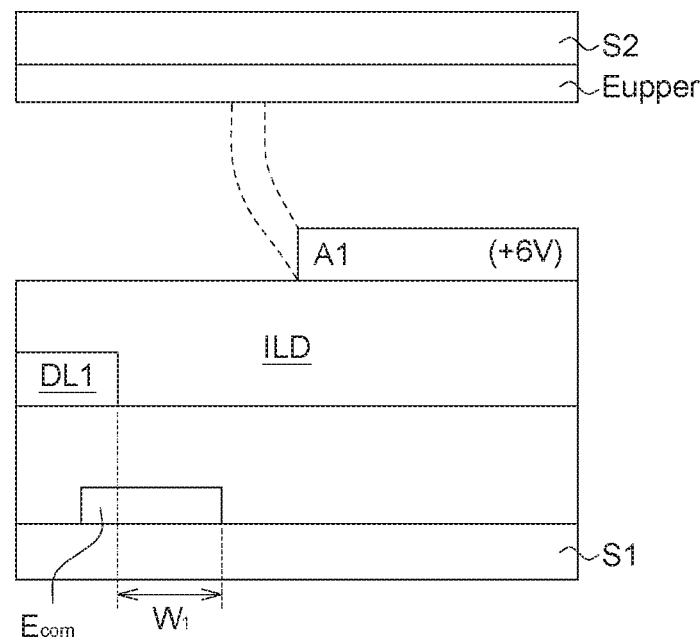
FIG. 5B is a cross-sectional view of a portion of a pixel region of a display apparatus according to an embodiment.

The electrode design disclosed according to an embodiment effectively reduces the capacitive coupling effect, such that during the operation of the display apparatus, the display quality of pixels will not be interfered or affected by corresponding video signals transmitted by the data lines. FIG. 4 is a schematic diagram of four adjacent pixel regions of the display apparatus exemplified as one example of the present disclosure. The four adjacent pixel regions of FIG. 4 are pixel regions P1, P2, P3 and P4. The thin-film transistors in the pixel regions P1 and P2 are connected to the first data line DL1. The thin-film transistors in the pixel regions P3 and P4 are connected to the second data line DL2. FIG. 5A is a cross-sectional view of a portion of a pixel region of a conventional display apparatus. FIG. 5B is a cross-sectional view of a portion of a pixel region of a display apparatus according to an embodiment.

In each pixel region of FIG. 4, the first sub-pixel region and the second sub-pixel region (such as the bright region and the dark region of a display apparatus in a low color shift display mode) are designated as A (including A1, A2, A3 and A4) and B (including B1, B2, B3 and B4), respectively. Normally, when the display apparatus is in the low color shift display mode, the first sub-pixel regions A1, A2, A3 and A4 are the main regions contributing brightness. Refer to FIG. 1A and the descriptions of related structures of the pixel region. According to an embodiment, the width of the part of the common electrode positioned between the first sub-pixel regions A1 (A2) and the first data line DL1 (such as the width W1 of the first portion of the common electrode) is greater than the width of the part of the common electrode positioned between the second sub-pixel regions B1(B2) and the first data line DL1 (such as the width W2 of the second portion of the common electrode). During the operation of the display apparatus, when the first scan line SL1 outputs a high voltage to turn on the transistors in the pixel regions P1 and P3, the first data line DL1 and the second data line DL2 respectively transmit signals to the turned-on transistors to charge the ITO electrodes. It is assumed that the ITO electrodes in the first sub-pixel regions A1 and A3 of the pixel region P1 and P3 are charged to +6V and −6V, respectively. At the next timing sequence, when the second scan line SL2 outputs a high voltage to turn on the transistors in the pixel regions P2 and P4, the first data line DL1 and the second data line DL2 respectively transmit signals to the turned-on transistors to charge the ITO electrodes in the first sub-pixel regions A2 and A4 of the pixel regions P2 and P4 to −6V and −6V, respectively. Meanwhile, the first data line DL1 (−6V) will affect the first sub-pixel region A1 (6V) of the pixel region P1 and generate the capacitive coupling effect. As shown in FIG. 5A, the conventional display apparatus does not have the design of width variation of a part of the common electrode (ex. first portion) in the pixel region, and the distance, such as distance $W_0$, which between the first data line DL1 (connecting the transistor of the pixel region) and an edge of the common electrode adjacent to the first pixel region is fixed (the part of the common electrode could not overlap with the data line DL, the distance $W_0$ is inferred as the width of the part of the common electrode). Under such circumstance, when the voltage on the data line changes, the electrical field distribution will be influenced, and the capacitive coupling effect will become stronger and result in cross-talking.

In a comparative embodiment as shown in FIG. 5B, the capacitive coupling effect of the display apparatus can be reduced through the width design for the common electrode in the pixel region, for example, the distance between the first data line DL1 (connecting the transistor of the pixel region) and an edge of the part of the common electrode adjacent to the first pixel region is increased, such as increased to distance W1 (In another embodiment, the part of the common electrode could not overlap with the data line DL, the distance W1 is inferred as the width of the part of the common electrode). Moreover, the voltage (Vcom) applied to the common electrode has a fixed value, such that the voltage difference between the upper electrode and the pixel electrode can remain the same. By increasing the width of the part of the common electrode corresponding to the bright region, the electrical field distribution can be much stable, the capacitive coupling effect can be effectively reduced, and the display quality can be greatly increased. Since the part of the common electrode farther away from the first data line DL1 (adjacent to the second data line DL2) is not significantly affected by the voltage change which occurs when the second data line transmits signals, the width of another part of the common electrode farther away from the first data line DL1 can maintain the same. It should be noted that in FIG. 1A, the pixel region PX is defined by two adjacent scan lines and two adjacent data lines, and the pixel region PX comprises the first sub-pixel region and the second sub-pixel region, the pixel region can be regarded as a pixel region when displaying the image; in another embodiment, the pixel region could be different from a pixel region when displaying the image. Therefore, in another embodiment, the second scan line SL2 controls the second sub-pixel region B1 and the first sub-pixel region A2 are regarded as a pixel region when displaying the image. It is also not out of the scope of the disclosure.

The capacitive coupling effect and how the change in the widths of the common electrode affects the transmittance are also investigated in the present disclosure. A number of related simulation experiments are exemplified below.

Figure 6:
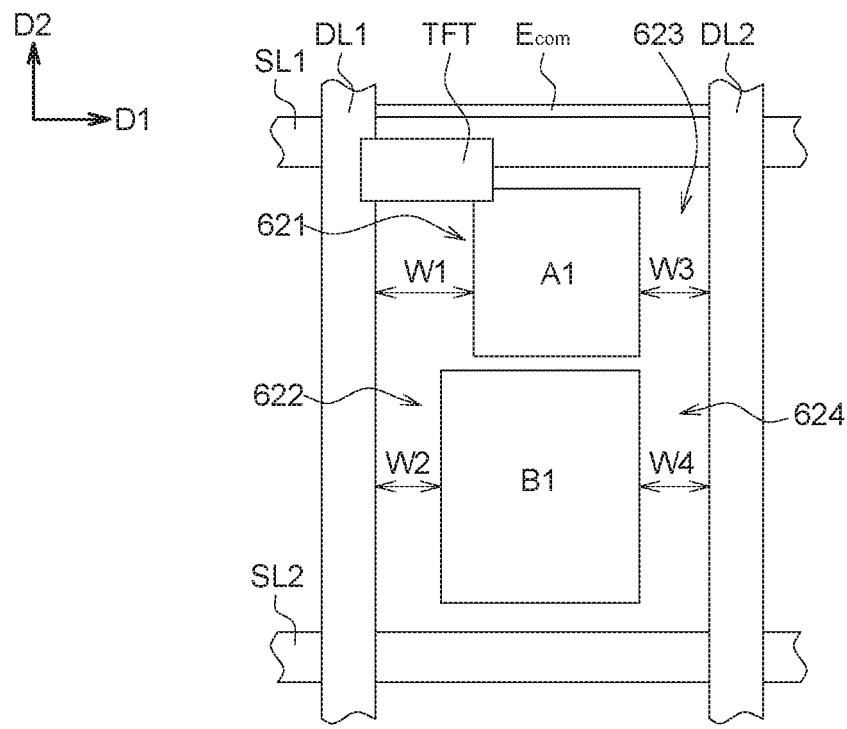
FIG. 6 is a schematic diagram of a single pixel region labeling with the corresponding parameters in a simulation experiment.

FIG. 6 is a schematic diagram of a single pixel region labeling with the corresponding parameters in a simulation experiment. The thin-film transistor TFT is connected to the first data line DL1 and the first sub-pixel region A1. The common electrode $E_{com}$ includes a first portion 621 and a second portion 622 connected to the first portion 621. The first portion 621 is positioned between the ITO electrode (the same as the first electrode) in the first sub-pixel region A1 and the first data line DL1. The second portion 622 is positioned between the ITO electrode (the same as the second electrode) of the second sub-pixel region B1 and the first data line DL1. The width W1 of the first portion 621 in the first direction D1 is greater than the width W2 of the second portion 622 in the first direction D1. Additionally, the common electrode $E_{com}$ further includes a third portion 623 and a fourth portion 624 connected to the third portion, and the widths of the third portion 623 and the fourth portion 624 in the first direction D1 are W3 and W4, respectively. The first portion 621 and the third portion 623 are at different sides of the first electrode, the second portion 622 and the fourth portion 624 are at different sides of the second electrode.

Simulation Experiment 1

Simulation experiment 1 is conducted by providing three different combinations of widths W1/W2/W3/W4, including 5 μm/5 μm/5 μm/5 μm (equal width), 2 μm/2 μm/2 μm/2 μm (equal width), and 5 μm/2 μm/2 μm/2 μm (one of the combinations of widths in the embodiments). Table 1 lists the results of transmittance obtained in simulation experiment 1 under different combinations of widths in the absence of capacitive coupling effect (for example, the voltage on the first data line=6V, the voltage on the ITO electrode=6V) and in the presence of capacitive coupling effect (for example, the voltage on the first data line=0V, the voltage on the ITO electrode=6V).

TABLE 1

| | Experiment Group | | |
|---|---|---|---|
| | 5 μm/5 μm/ 5 μm/5 μm | 5 μm/2 μm/ 2 μm/2 μm | 2 μm/2 μm/ 2 μm/2 μm |
| Transmittance in the absence of capacitive coupling effect (the voltage on the first data line = 6 V; the voltage on the ITO electrode = 6 V) | 18.90% | 19.89% | 19.96% |
| Transmittance in the presence of capacitive coupling effect (the voltage on the first data line = 0 V; the voltage on the ITO electrode = 6 V) | 18.49% | 19.33% | 19.36% |
| Transmittance loss (%) | 2.17% | 2.82% | 3% |

The results of Table 1 show that when the capacitive coupling effect is present, the transmittance obtained under different combinations of widths decreases by 2.17%, 2.82% (embodiment) and 3% respectively. When the combination of width of the conventional structure is 5 μm/5 μm/5 μm/5 μm, the transmittance decreases due to the lower aperture ratio. When the combination of width of the conventional structure is 2 μm/2 μm/2 μm/2 μm, the transmittance is increased (such as 18.90% vs. 19.96%), but decreases by 3% in the presence of capacitive coupling effect. When the combination of width of the structure according to one of the embodiments is 5 μm/2 μm/2 μm/2 μm, the transmittance only decreases by 2.82% (<3%) in the presence of capacitive coupling effect. Therefore, the width design for the common electrode disclosed in the embodiments of the present disclosure reduces the capacitive coupling effect and maintains the transmittance.

Simulation Experiment 2

Simulation experiment 2 investigates different combinations of widths W1/W2/W3/W4 when the pixels are driven by a high gray-scale voltage. There are several combinations of widths W1/W2/W3/W4 investigated in the simulation experiment 2, and Table 2 only lists five combinations of widths, including 5 μm/2 μm/2 μm/2 μm, 4 μm/2 μm/2 μm/2 μm, 3 μm/2 μm/2 μm/2 μm, 2 μm/2 μm/2 μm/2 μm and 1 μm/2 μm/2 μm/2 μm.

Table 2 lists the results of transmittance obtained in simulation experiment 2 under different combinations of widths in the presence of capacitive coupling effect (for example, the voltage on the first data line=0V, voltage on the ITO electrode=6V, cross-talking occurs) and in the absence of capacitive coupling effect (for example, the voltage on the first data line=6V, the voltage on the ITO electrode=6V), and the transmittance loss (TR % loss). The transmittance loss can be expressed as:

Transmittance loss (TR % loss)=1−(transmittance % in the presence of capacitive coupling effect)/ (transmittance % in the absence of capacitive coupling effect).

TABLE 2

|  | Voltage on the first data line Voltage on the ITO electrode | 6 V 6 V | 6 V 0 V | Transmittance loss (TR % loss) |
|---|---|---|---|---|
| Experiment group (μm/μm/ μm/μm) | 5/2/2/2 | 17.97% | 17.36% | 3.39% |
|  | 4/2/2/2 | 17.99% | 17.37% | 3.43% |
|  | 3/2/2/2 | 18.01% | 17.38% | 3.46% |
|  | 2/2/2/2 | 18.03% | 17.39% | 3.58% |
|  | 1/2/2/2 | 18.05% | 17.39% | 3.61% |

Figure 7:
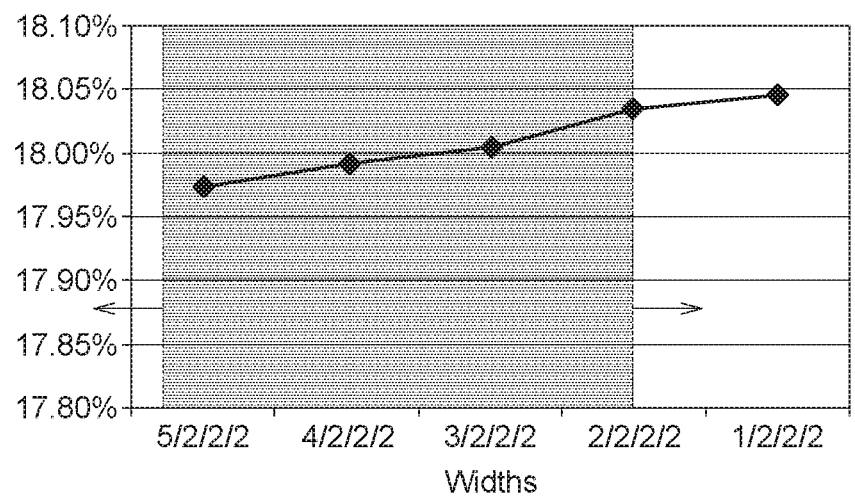
FIG. 7 is a curve of transmittance obtained in simulation experiment 2 under different combinations of widths in the absence of capacitive coupling effect.
Figure 8:
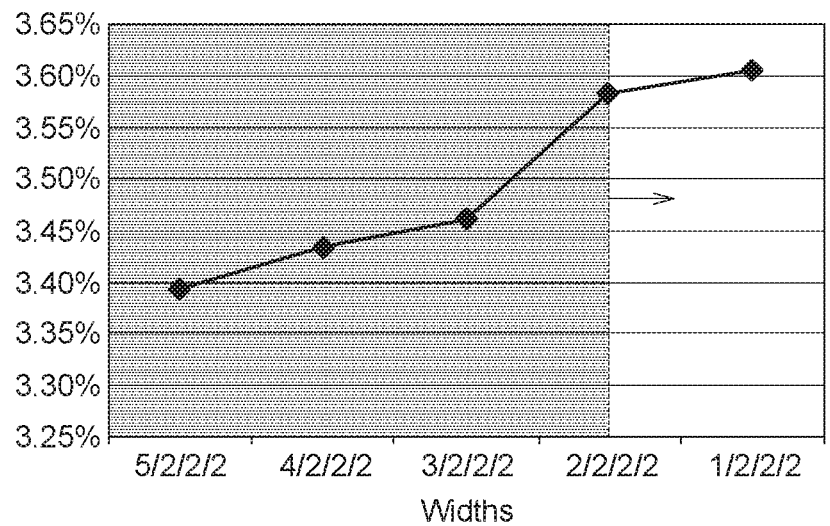
FIG. 8 is a curve of transmittance loss obtained in simulation experiment 2 under different combinations of widths in the presence of capacitive coupling effect.

FIG. 7 is a curve of transmittance obtained in simulation experiment 2 under different combinations of widths in the absence of capacitive coupling effect. FIG. 8 is a curve of transmittance loss obtained in simulation experiment 2 under different combinations of widths in the presence of capacitive coupling effect. The values for the points of the diagrams of FIG. 7 and FIG. 8 are illustrated in Table 2. The experimental results show that better display quality can be achieved when the width W1 is greater than width W2 (as indicated in FIG. 8, the transmittance loss caused by crosstalking has a decreasing trend). However, after the width W1 increases to a certain level, the transmittance may become too low (FIG. 7). After the width W1 decreases to a certain level (such as 2 μm), the transmittance loss may become too high (FIG. 8), and the problem of cross-talking cannot be resolved, and the problem of line breakage may even occur.

According to the above disclosure, in practical application, a better value of width W1 can be obtained from the curves of FIG. 7 and FIG. 8 with reference to the transmittance standard of the product. Anyone ordinary skilled in the technology field will understand that the combinations of widths and transmittance listed in above tables and the curves of FIG. 7 and FIG. 8 are for reference only, not for limiting the scope of widths of the present disclosure. For example, in an embodiment, the width W2 of the second portion 122 in the first direction D1 can be between 1-3 μm. In another embodiment, the ratio of the width W1 of the first portion 121 in the first direction D1 to the width W2 of the second portion 122 in the first direction D1 can be smaller than or equal to 6, and the width W1 of the first portion 121 in the first direction D1 is not larger than 10 μm.

Figure 9A:
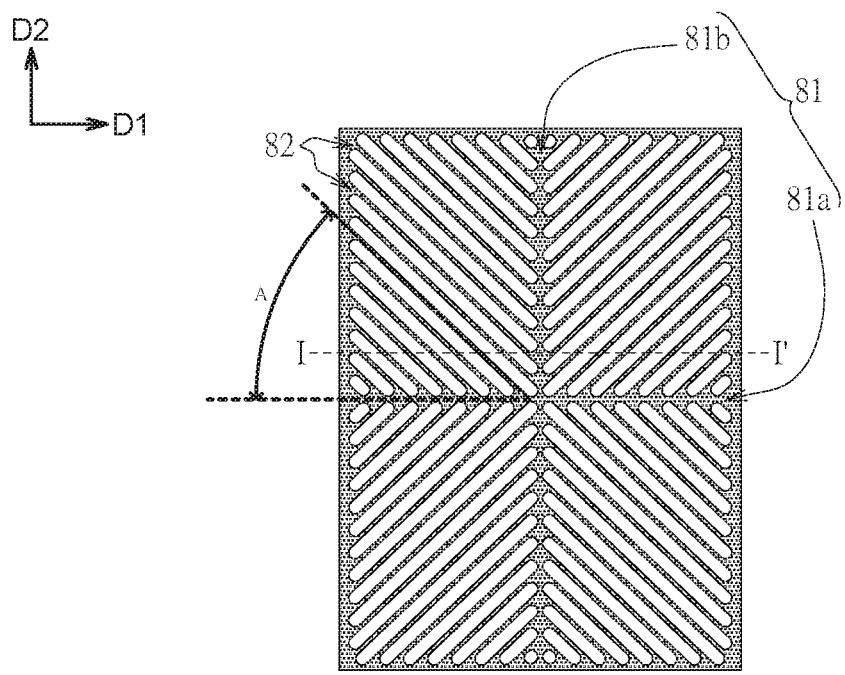
FIG. 9A is a schematic diagram of disclination in a single pixel region according to an embodiment.
Figure 9B:
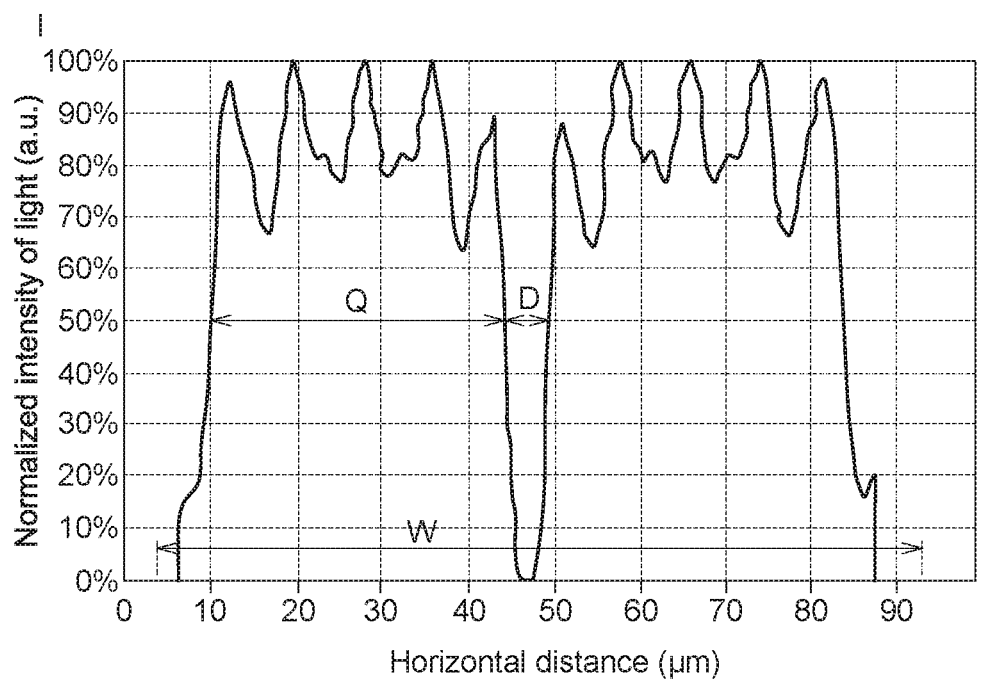
FIG. 9B is a diagram of normalized intensity of the light along a horizontal distance according to the cross-sectional line I-I' of FIG. 9A.

Apart from the design disclosed above, the embodiment further provides a design of angle of the disclination to increase the transmittance of the pixels. FIG. 9A is a schematic diagram of disclination in a pixel region according to an embodiment. FIG. 9B is a diagram of normalized intensity of the light on a horizontal distance according to the cross-sectional line I-I' of FIG. 9A. The present embodiment is exemplified by the disclination, which is generated in accordance with the pixel electrode pattern (that is, the slit pattern and the tilt directions of the slits of the pixel electrode), during the operation in a pixel region. That is, a single pixel region has many alignment regions with different alignment directions. When a voltage is applied to a pixel region, a central cross-shaped disclinations is generated at the boundary of the alignment regions, the tilted disclinations in the alignment region correspond to the slits of the pixel electrode, and marginal disclinations are generated at the edges of each alignment region due to the influence of the electrical field and the alignment directions of each alignment region.

As shown in FIG. 9A, the disclinations of the first sub-pixel region includes a cross-shaped disclinations 81 (including a horizontal section 81a and a vertical section 81b) and a plurality of serrated disclinations 82 located outside the cross-shaped disclinations 81. One of the serrated disclinations 82 and the horizontal section 81a form an angle A, and the horizontal section 81a extends along the first direction D1. According to an embodiment, the angle A satisfies:

$X-4 \leq A \leq X+4$, A is greater than 0 degree and less than 90 degrees,

Wherein, $X=-11.22-0.8826W+1.944R+4.855H+0.005155W^2-0.04687H^2-0.020573WR-0.026539WH+100.320/W$.

The first electrode EP1 has two lateral sides parallel to the first data line (such as DL1 of FIG. 1A), the two lateral sides are apart from each other, a distance between the two lateral sides of the first electrode EP1 in the first direction is W, the first electrode further has two horizontal sides apart from each other and parallel to the first scan line, a distance between the two horizontal sides of the first electrode in a second direction is L, and the second direction is substantially perpendicular to the first direction. R represents the ratio of the distance L to the said width W, that is, $R=L/W$.

H represents the width of one side (left side or right side) of the first electrode EP1 shielded in the first direction, that is, $H=(W-Q-D)/2$. Q represents the width of half of a visible short side of the first electrode in a direction parallel to the first scan line (such as SL1 of FIG. 1A). More specifically, Q represents the distance (usually measured in μm) between a boundary of the vertical section 81b and a boundary near the first data line DL1 after the transistor connected to the first electrode is turned on, the distance Q is in the first direction D1. The vertical section 81b includes a section extending along a second direction D2 (such as a direction parallel to the first data line DL1) but not overlapping with the horizontal section 81a. D represents the full width at half maximum (FWHM, usually measured in μm) of the normalized intensity of light of the section of the vertical section in the first direction D1.

In an embodiment, 30 μm≤W μm≤120 μm, 1≤R≤4, and 0≤H μm≤15 μm. It could be understood that L, W, H, Q, D, R, X are dimensionless values. After the angle is obtained, the slit pattern of the pixel electrode can be designed according to the angle. When the angle A satisfies the equation above, the transmittance will have significant improvement in comparison to that of an ordinary slit angle of 45°.

According to the design of width variation of the common electrode in a region (such as a pixel region), the display apparatus disclosed in above embodiments of the present disclosure can reduce the capacitive coupling effect, improve the electrical performance of the display apparatus, and maintain superior transmittance of the pixel region. Therefore, the design of the embodiments of the present disclosure provides the display apparatus using the same with superior, stable display quality and increases yield of production.

The structural configurations of FIG. 1A, FIG. 1B, FIG. 2A, FIG. 2B, FIG. 3 and FIG. 4 are provided for describing some embodiments of the present disclosure only, not for limiting the scope of the present disclosure. The embodiments with different structural configurations, such as the size of the pixel electrodes in the first sub-pixel region and the second sub-pixel region, connection of other traces, whether multiple domains are formed in the pixel region or the number of domains, and the angle formed by the extending directions of the data line and the scan line (such as an acute angle or a right angle), are all within the field of application of the present disclosure. A person ordinary skilled in the technology field can make necessary modifications or adjustments to fit actual needs without breaching the spirit and scope of the present disclosure.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display apparatus, comprising:
   a first base plate and a second base plate, wherein a liquid crystal layer is disposed between the first base plate and the second base plate;
   a first scan line and a second scan line adjacent to the first scan line, and the first scan line and the second scan line disposed above the first base plate and extending along a first direction;
   a first data line and a second data line adjacent to the first data line, and the first data line and the second data line disposed above the first base plate, wherein the first scan line, the second scan line, the first data line and the second data line define a first region, and the first region comprises a first sub-pixel region and a second sub-pixel region;
   the first sub-pixel region comprises:
      a first thin-film transistor disposed above the first base plate and electrically connected to the first scan line and the first data line; and
      a first electrode electrically connected to the first thin-film transistor;
   the second sub-pixel region comprises a second electrode; and
   a first common electrode disposed above the first base plate, wherein the first common electrode comprises a first portion and a second portion connected to the first portion, the first portion corresponds to the first sub-pixel region and is adjacent to the first data line, the second portion corresponds to the second sub-pixel region and is adjacent to the first data line, and a width of the first portion in the first direction is greater than a width of the second portion in the first direction, wherein a ratio of the width of the first portion in the first direction to the width of the second portion in the first direction is smaller than or equal to 6, and the width of the first portion in the first direction is not larger than 10 µm.

2. The display apparatus according to claim 1, wherein the width of the second portion in the first direction is between 1 µm and 3 µm.

3. The display apparatus according to claim 1, wherein the first common electrode further comprises a third portion and a fourth portion connected to the third portion, the third portion corresponds to the first sub-pixel region and is adjacent to the second data line, the fourth portion corresponds to the second sub-pixel region and is adjacent to the second data line, and a difference between a width of the third portion in the first direction (W3) and a width of the fourth portion in the first direction (W4) is a first difference, a difference between the width of the first portion in the first direction (W1) and the width of the second portion in the first direction (W2) is a second difference, and the first difference is smaller than the second difference.

4. The display apparatus according to claim 3, wherein the width of the third portion in the first direction is substantially equal to the width of the fourth portion in the first direction.

5. The display apparatus according to claim 3, wherein the width of the first portion in the first direction is greater than the width of the third portion in the first direction.

6. The display apparatus according to claim 1, further comprising:
   a second common electrode disposed between the second scan line and a third scan line adjacent to the second scan line;
   wherein the second scan line, the third scan line, the first data line and the second data line define a second region, and the second region comprises a third sub-pixel region and a fourth sub-pixel region, wherein the third sub-pixel region comprises:
      a second thin-film transistor electrically connected to the second scan line and the second data line;
      a third electrode is electrically connected to the second thin-film transistor,
      the fourth sub-pixel region comprises a fourth electrode;
      wherein the second common electrode is disposed above the first base plate and comprises a fifth portion and a sixth portion near the second data line, the fifth portion corresponds to the third sub-pixel region and is adjacent to the second data line, the sixth portion corresponds to the fourth sub-pixel region and is adjacent to the second data line, and a width of the fifth portion in the first direction is greater than a width of the sixth portion in the first direction.

7. The display apparatus according to claim 6, wherein the first common electrode further comprises a third portion and a fourth portion connected to the third portion, the third portion corresponds to the first sub-pixel region and is adjacent to the second data line, the fourth portion corresponds to the second sub-pixel region and is adjacent to the second data line, and the width of the sixth portion in the first direction is substantially equal to a width of the fourth portion in the first direction.

8. The display apparatus according to claim 6, wherein the width of the fifth portion in the first direction is substantially equal to the width of the first portion in the first direction.

9. The display apparatus according to claim 1, wherein the first electrode and the second electrode are isolated from each other.

10. The display apparatus according to claim 1, wherein the first data line and the second data line extend along a second direction, and a length of the first portion in the second direction is greater than or equal to a length of the first electrode in the second direction.

11. The display apparatus according to claim 10, wherein a length of the second portion in the second direction is greater than or equal to a length of the second electrode in the second direction.

12. The display apparatus according to claim 11, wherein a minimum width of the first portion in the first direction is greater than a minimum width of the second portion in the first direction.

13. The display apparatus according to claim 1, wherein when a voltage is applied to the first region, the first sub-pixel region further comprises:
   a cross-shaped disclinations and a plurality of serrated disclinations located surrounding the cross-shaped disclinations, wherein one of the serrated disclination and a horizontal section of the cross-shaped disclination form an angle A, the horizontal section extends along the first direction, and the angle A satisfies:

$X-4 \leq A \leq X+4$, $A$ is greater than 0 degree and less than 90 degrees, wherein, $X=-11.22-0.8826 W+1.944R+4.855H+0.005155 W^2-0.04687 H^2-0.020573WR-0.026539WH+100.320/W$, the first electrode has two lateral sides apart from each other and parallel to the first data line, W represents a width between the two lateral sides of the first electrode in the first direction; the first electrode further has two horizontal sides apart from each other and parallel to the first scan line, L represents a distance between the two horizontal sides of the first electrode in a second direction, and the second direction is substantially perpendicular to the first direction R represents a ratio of the distance L to the width W (R=L/W);

H represents a width of one side of the first electrode shielded in the first direction, and Q represents a width of half of a visible short side of the first electrode in the first direction, wherein 30 μm≤W μm≤120 μm, 1≤R≤4 and 0≤H μm≤15 μm, and L, W, H, Q, R, X are dimensionless values.

14. The display apparatus according to claim 13, wherein the cross-shaped disclination comprise at least a vertical section, and the vertical section comprises a section extending along a second direction parallel to the first data line but not overlapping with the horizontal section, wherein H=(W−Q−D)/2, and D represents a full width at half maximum value of the normalized intensity of light of the section of the vertical section in the first direction.

15. The display apparatus according to claim 1, wherein the second electrode is electrically coupled to the second scan line.

* * * * *